United States Patent
Wu

(10) Patent No.: US 9,661,273 B2
(45) Date of Patent: May 23, 2017

(54) VIDEO CONFERENCE DISPLAY METHOD AND DEVICE

(71) Applicant: ZTE CORPORATION, Shenzhen, Guangdong Province (CN)

(72) Inventor: Xianyun Wu, Shenzhen (CN)

(73) Assignee: ZTE CORPORATION (CN)

( * ) Notice: Subject to any disclaimer, the term of this patent is extended or adjusted under 35 U.S.C. 154(b) by 64 days.

(21) Appl. No.: 14/420,734

(22) PCT Filed: Jul. 31, 2013

(86) PCT No.: PCT/CN2013/080574
§ 371 (c)(1),
(2) Date: Feb. 10, 2015

(87) PCT Pub. No.: WO2013/178188
PCT Pub. Date: Dec. 5, 2013

(65) Prior Publication Data
US 2015/0208036 A1    Jul. 23, 2015

(30) Foreign Application Priority Data

Aug. 24, 2012   (CN) .......................... 2012 1 0305508

(51) Int. Cl.
*H04N 7/14*    (2006.01)
*H04N 7/15*    (2006.01)
(Continued)

(52) U.S. Cl.
CPC ........... *H04N 7/152* (2013.01); *G03H 1/0005* (2013.01); *H04N 13/0059* (2013.01); *G03H 2001/0088* (2013.01)

(58) Field of Classification Search
USPC ........... 348/14.01, 14.07, 14.08, 14.09, 14.1, 348/14.12; 370/260, 261, 262, 277, 278
See application file for complete search history.

(56) References Cited

U.S. PATENT DOCUMENTS 8,736,659 B2 * 5/2014 Liu ..................... H04N 7/147
348/14.07
2003/0067536 A1   4/2003 Boulanger et al.
(Continued)

FOREIGN PATENT DOCUMENTS

CN   101291415   10/2008
CN   101771830   7/2010
(Continued)

OTHER PUBLICATIONS

Video: Cisco holographic meeting system, Tetease Technology Report, Jun. 2, 2008 (Jun. 2, 2008), paragraphs 1-2, http:/tech.163.com/08/0602/13/4DE114FK000928R4.html.
(Continued)

*Primary Examiner* — Yosef K Laekemariam
(74) *Attorney, Agent, or Firm* — McAndrews, Held & Malloy, Ltd.

(57) ABSTRACT

A video conference display method includes: an MCU obtaining a stereoscopic video source of a conference site where a first terminal device in a video conference is located; and the MCU sending the stereoscopic video source to one or more other terminal devices, except the first terminal device, in the video conference, wherein the stereoscopic video source is used by one or more other terminal devices for non-screen displaying of the conference site where the first terminal device is located in one or more conference sites where the one or more other terminal devices are located. The scheme solves the problem of poor user experience of video conferencing, improves the sense of being present at the video conference, has no other differences from an on-site conference except that the entities cannot be touched, improves the user experience, and is an important step towards widely popularizing the video system.

13 Claims, 4 Drawing Sheets

(51) Int. Cl.
    *H04N 13/00*    (2006.01)
    *G03H 1/00*     (2006.01)

(56)            References Cited

U.S. PATENT DOCUMENTS

2006/0209181  A1    9/2006   Van Geest
2010/0302345  A1   12/2010   Baldino et al.
2011/0069139  A1    3/2011   Liu
2011/0090970  A1    4/2011   Kim et al.
2011/0228040  A1    9/2011   Blanche et al.
2013/0293584  A1*  11/2013   Anderson ............... G06T 11/00
                                                         345/633

FOREIGN PATENT DOCUMENTS

WO     2012059279  A1    5/2012
WO     2012059280  A2    5/2012
WO     2012059280  A3    8/2012

OTHER PUBLICATIONS

Communication with Supplementary European Search Report mailed Jul. 15, 2015 corresponding to European Application No. EP 13797480.4.
3D-Vedeokonferenz, Funkschau, Weka Fachzeitschriften Verlag, Poing, DE, vol. 68, No. 8, Mar. 29, 1996 (Mar. 29, 1996), pp. 67-69, XP000591288, ISSN: 0016-2841.

* cited by examiner

VIDEO CONFERENCE DISPLAY METHOD AND DEVICE

CROSS-REFERENCE TO RELATED APPLICATIONS/INCORPORATION BY REFERENCE

This application is a 371 of International Patent Application No. PCT/CN2013/080574, filed Jul. 31, 2013, entitled "VIDEO CONFERENCE DISPLAY METHOD AND DEVICE", which claims priority to Chinese Patent Application No. 201210305508.3, filed Aug. 24, 2012, entitled "VIDEO CONFERENCE DISPLAY METHOD AND DEVICE". The above-identified applications are hereby incorporated herein by reference in their entirety.

TECHNICAL FIELD

The disclosure relates to the field of Communications, and in particular to a video conference display method and device.

BACKGROUND

A video conference system is used to hold a remote, multi-point, real-time conference and can implement video and voice transmission and interaction among multiple points. Owing to the capability of holding simple and real-time conference and good visual effects and diversity, the video conference system is widely used in enterprises. As the technology becomes more mature, the video conference system may be widely applied to family life in the future. A video conference system mainly consists of terminal devices and a central office device (also referred to as Management Control Unit, MCU). Generally, in a small-scale video conference system, multiple terminal devices are connected in a centralized manner to the MCU to form a star topology network. The terminal device may be a user side device, and may be generally equipped with multimedia components, such as TV set, camera, loudspeaker, and microphone. The MCU is a system side device for centralized exchange and processing for multimedia information of each terminal.

With the development of 3D and 4D technologies, the visual demand is higher and higher, and a feeling of immersive experience, like a wonderful "mirage", is pursued. At present, in a video conference system, a remote image is generally displayed using a TV set or other screen media, and such a display manner brings poor stereoscopic vision impact and feeling of immersive experience.

Regarding the problem of poor user experience of video conferencing in the related art, no effective solution has been proposed at present.

SUMMARY

Regarding the problem of poor user experience of video conferencing in the related art, the embodiments of the disclosure provide a video conference display method and device to at least solve the above-mentioned problem.

According to one embodiment of the disclosure, provided is a video conference display method, including: a Management Control Unit (MCU) obtaining a stereoscopic video source of a conference site where a first terminal device in a video conference is located; and the MCU sending the stereoscopic video source to one or more other terminal devices, except the first terminal device, in the video conference, wherein the stereoscopic video source is used by the one or more other terminal devices for non-screen displaying of the conference site where the first terminal device is located in one or more conference sites where the one or more other terminal devices are located.

In an example embodiment, the MCU obtaining the stereoscopic video source of the conference site where the first terminal device in the video conference is located includes: the MCU obtaining video data, audio data and video acquisition parameters of the conference site where the first terminal device is located sent from the first terminal device, and the MCU synthesizing the video data, the audio data and the video acquisition parameters to than the stereoscopic video source; or the MCU obtaining the stereoscopic video source sent from the first terminal device.

In an example embodiment, in a case that the video data is two-dimensional images taken by multiple cameras, the MCU synthesizes the two-dimensional image taken by the multiple cameras and the audio data according to the video acquisition parameters to form the stereoscopic video source; or in a case that the video data is a two-dimensional image taken by one camera, the MCU converts the two-dimensional image taken by the camera into a three-dimensional image according to the video acquisition parameters, and synthesizes the three-dimensional image and the audio data to form the stereoscopic video source.

According to another embodiment of the disclosure, provided is a video conference display method, including: a second terminal device receiving at least one stereoscopic video source sent from a Management Control Unit (MCU), wherein the at least one stereoscopic video source is at least one stereoscopic video of at least one conference site where at least one other terminal device, except the second terminal device, in a video conference which the second terminal attends is located; and the second terminal device performing non-screen displaying of the at least one stereoscopic video source in a conference site where the second terminal device is located.

In an example embodiment, the method further includes: the second terminal device acquiring video data, audio data and video acquisition parameters of the conference site where the second terminal device is located; and the second terminal device sending the video data, the audio data and the video acquisition parameters to the MCU, or the second terminal device synthesizing the video data, the audio data and the video acquisition parameters into a stereoscopic video source and sending the stereoscopic video source to the MCU.

In an example embodiment, in a case that the video data is two-dimensional images taken by multiple cameras, the second terminal device synthesizes the two-dimensional image taken by the multiple cameras and the audio data according to the video acquisition parameters to form the stereoscopic video source; or in a case that the video data is a two-dimensional image taken by one camera, the second terminal device converts the two-dimensional image taken by the camera into a three-dimensional image according to the video acquisition parameters, and synthesizes the three-dimensional image and the audio data to form the stereoscopic video source.

In an example embodiment, the second terminal device performing the non-screen displaying of the at least one stereoscopic video source in the conference site where the second terminal device is located by one of the following manners: a holographic projection device, or multiple projectors set at different angles.

In an example embodiment, the second terminal device performing the non-screen displaying of the at least one stereoscopic video source in the conference site where the second terminal device is located includes: the second terminal device performing the non-screen displaying of the at least one stereoscopic video source in the conference site where the second terminal device is located according to at least one predetermined position.

According to still another embodiment of the disclosure, provided is a video conference display device located in a Management Control Unit (MCU), wherein the video conference display device includes: an obtaining component which is configured to obtain a stereoscopic video source of a conference site where a first terminal device in a video conference is located; and a sending component which is configured to send the stereoscopic video source to one or more other terminal devices, except the first terminal device, in the video conference, wherein the stereoscopic video source is used by the one or more other terminal devices for non-screen displaying of the conference site where the first terminal device is located in one or more conference sites where the one or more other terminal devices are located.

In an example embodiment, the obtaining component includes: an obtaining unit which is configured to obtain video data, audio data and video acquisition parameters of the conference site where the first terminal device is located sent from the first terminal device; and a synthesis unit which is configured to, in a case that the video data is two-dimensional images taken by multiple cameras, synthesize the two-dimensional image taken by the multiple cameras and the audio data according to the video acquisition parameters to form the stereoscopic video source, or in a case the video data is a two-dimensional image taken by one camera, convert the two-dimensional image taken by the camera into a three-dimensional image according to the video acquisition parameters, and synthesize the three-dimensional image and the audio data to form the stereoscopic video source.

According to still another embodiment of the disclosure, provided is a video conference display device located in a second terminal device, wherein the video conference display device includes: a receiving component which is configured to receive at least one stereoscopic video source sent from a Management Control Unit (MCU), wherein the at least one stereoscopic video source is at least one stereoscopic video of at least one conference site where at least one other terminal device, except the second terminal device, in a video conference which the second terminal attends is located; and a non-screen display component which is configured to perform non-screen displaying of the at least one stereoscopic video source in a conference site where the second terminal device is located.

In an example embodiment, the device further includes: an acquisition component which is configured to acquire video data, audio data and video acquisition parameters of the conference site where the second terminal device is located; and a sending component which is configured to send the video data, the audio data and the video acquisition parameters to the MCU, or to synthesize the video data, the audio data and the video acquisition parameters to form a stereoscopic video source and then send the stereoscopic video source to the MCU.

By means of the method, an MCU obtains a stereoscopic video source of a conference site where a first terminal device in a video conference is located; and the MCU sends the stereoscopic video source to one or more other terminal devices, except the first terminal device, in the video conference, wherein the stereoscopic video source is used by one or more other terminal devices for non-screen displaying of the conference site where the first terminal device is located in one or more conference sites where the one or more other terminal devices are located, the disclosure solves the problem of poor user experience of video conferencing in the related art, improves the sense of being present at the video conference, has no other differences from an on-site conference except that the entities cannot be touched, improves the user experience, and is an important step towards widely popularizing the video system.

DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DESCRIPTION OF EMBODIMENTS

The disclosure is described, below in detail by reference to the accompanying drawings in conjunction with embodiments. It should be noted that the embodiments and the characteristics of the embodiments can be combined with each other if no conflict is caused.

Figure 1:
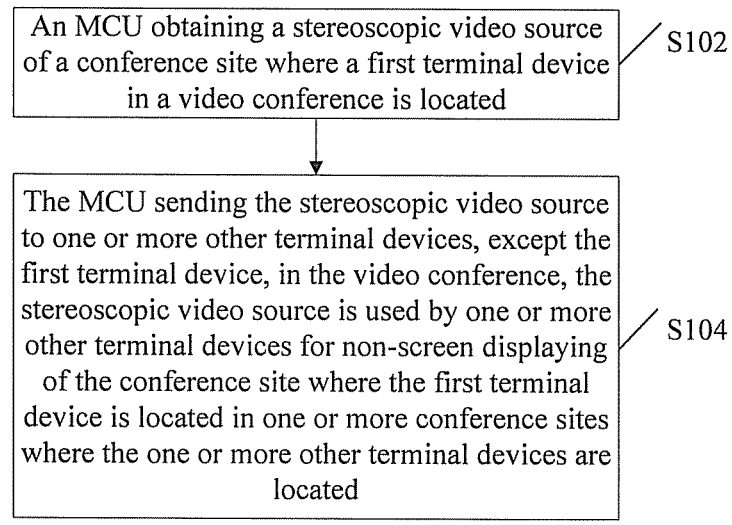
FIG. 1 shows a flowchart of a video conference display method according to an embodiment of the disclosure.

This embodiment provides a video conference display method. FIG. 1 shows a flowchart of a video conference display method according to an embodiment of the disclosure. As shown in FIG. 1, the method includes the following steps.

S102, an MCU obtains a stereoscopic video source of a conference site where a first terminal device in a video conference is located; and S104, the MCU sends the stereoscopic video source to one or more other terminal devices, except the first terminal device, in the video conference, wherein the stereoscopic video source is used by one or more other terminal devices for non-screen displaying of the conference site where the first terminal device is located in one or more conference sites where the one or more other terminal devices are located.

Through the above-mentioned steps in this embodiment, the MCU obtains a stereoscopic video source of a conference site where a first terminal device in a video conference is located, and sends the stereoscopic video source to one or more other terminal devices in the video conference, so that the stereoscopic video source may be used by one or more other terminal devices for stereoscopic displaying of the conference site where the first terminal device is located in one or more conference sites where the one or more other terminal devices are located. Thus, by means of displaying a physically real three-dimensional image in air in a manner of non-screen displaying, users corresponding to other terminal devices feel that the user corresponding to the first terminal device is just in the local conference site, which solves the problem of poor user experience of video conferencing in the related art, improves the sense of being present at the video conference, has no other differences from an on-site conference except that the entities cannot be touched, improves the user experience, and is an important step towards widely popularizing the video system.

As an example embodiment, the method of the MCU obtaining the above-mentioned stereoscopic video source may include: the first terminal device synthesizing the stereoscopic video source and then sending the stereoscopic video source, or the first terminal device directly sending video data, audio data and video acquisition parameters of the conference site where the first terminal device is located, and the MCU synthesizing the video data, audio data and video acquisition parameters to form the stereoscopic video source. By means of this method, the flexibility of solution is improved.

In an example embodiment, if the above-mentioned video data is three-dimensional images, the MCU or the first terminal device may make a convenient synthesis; if the above-mentioned video data is two-dimensional images, it is required to synthesize the two-dimensional images to form three-dimensional images, and then synthesize the three-dimensional images to form the stereoscopic video source. For example, in the case that the video data is two-dimensional images taken by multiple cameras, the MCU synthesizes the above-mentioned two-dimensional images taken by multiple cameras and the audio data to form the stereoscopic video source according to the video acquisition parameters; or in the case that the video data is a two-dimensional image taken by one camera, the MCU converts the two-dimensional image taken by the camera into a three-dimensional image according to the video acquisition parameters, and synthesizes the three-dimensional image and the audio data to form the stereoscopic video source.

Corresponding to the above-mentioned video conference display method, this embodiment provides a video conference display device located in a MCU. The device is used to implement the above-mentioned embodiments and example embodiments, which has been described and will not be explained here. As used below, the term "component" is a combination of software and/or hardware capable of implementing predetermined functions. Although the device described in the following embodiment may be preferably implemented by software, it would be conceived to implement hardware or a combination of software and hardware.

Figure 2:
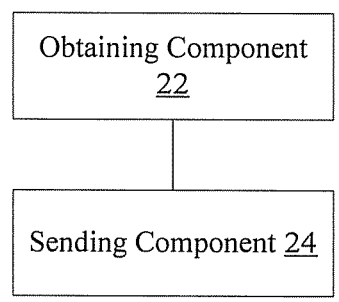
FIG. 2 shows a structure diagram of a video conference display device according to an embodiment of the disclosure.

FIG. 2 shows a structure diagram of a video conference display device according to an embodiment of the disclosure. As shown in FIG. 2, the device includes: an obtaining component 22 and a sending component 24. The components will be described below in detail.

The obtaining component 22 is configured to obtain a stereoscopic video source of a conference site where a first terminal device in a video conference is located; and the sending component 24 is coupled to the obtaining component 22 and configured to send the stereoscopic video source to one or more other terminal devices, except the first terminal device, in the video conference, wherein the stereoscopic video source is used by one or more other terminal devices for non-screen displaying of the conference site where the first terminal device is located in one or more conference sites where the one or more other terminal devices are located.

Through the above-mentioned components in this embodiment, the MCU uses the obtaining component 22 to obtain a stereoscopic video source of a conference site where a first terminal device in a video conference is located, and uses the sending component 24 to send the stereoscopic video source to one or more other terminal devices in the video conference, so that the stereoscopic video source may be used by the one or more other terminal devices for stereoscopic displaying of the conference site where the first terminal device is located in one or more conference sites where the one or more other terminal devices are located. Thus, by means of displaying a physically real three-dimensional image in air in a manner of non-screen displaying, users corresponding to other terminal devices feel that the user corresponding to the first terminal device is just in the local conference site, which solves the problem of poor user experience of video conferencing in the related art, improves the sense of being present at the video conference, has no other differences from an on-site conference except that the entities cannot be touched, improves the user experience, and is an important step towards widely popularizing the video system.

Figure 3:
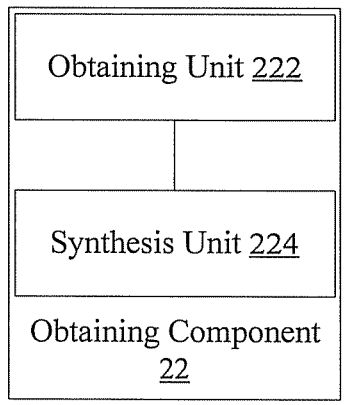
FIG. 3 shows an example structure diagram of an obtaining component according to an embodiment of the disclosure.

FIG. 3 shows an example structure diagram of an obtaining component 22 according to an embodiment of the disclosure. As shown in FIG. 3, the obtaining component 22 may includes: an obtaining unit 222 which is configured to obtain video data, audio data and video acquisition parameters of a conference site where the first terminal device is located sent from the first terminal device; and a synthesis unit 224 which is coupled to the obtaining unit 222 and configured to, in the case that the video data is two-dimensional images taken by multiple cameras, synthesize the two-dimensional image taken by the multiple cameras and the audio data to form the stereoscopic video source according to the video acquisition parameters, or in the case that the above-mentioned video data is a two-dimensional image taken by one camera, to convert the two-dimensional image taken by the camera into a three-dimensional image according to the video acquisition parameters and synthesize the three-dimensional image and the audio data to form the stereoscopic video source.

Figure 4:
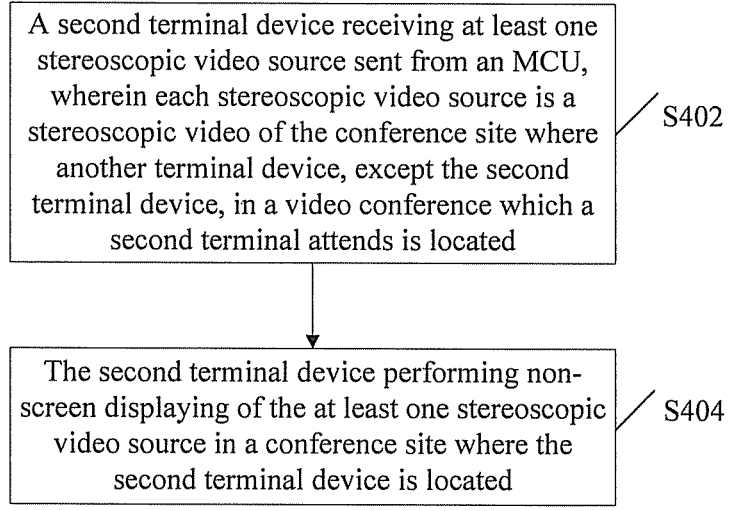
FIG. 4 shows a flowchart of another video conference display method according to an embodiment of the disclosure.

This embodiment also provides another video conference display method. FIG. 4 shows a flowchart of another video conference display method according to an embodiment of the disclosure. As shown in FIG. 4, the method includes the following steps.

S402, a second terminal device receives at least one stereoscopic video source sent from an MCU, wherein the at least one stereoscopic video source is at least one stereoscopic video of at least one conference site where at least one other terminal device, except the second terminal device, in a video conference which the second terminal attends are located; and S404, the second terminal device performs non-screen displaying of the at least one stereoscopic video source in a conference site where the second terminal device is located.

Through the above-mentioned steps in this embodiment, the second terminal device receives at least one stereoscopic video source of at least one conference site where at least one other terminal device in a video conference is located sent from the MCU, and performs non-screen displaying of the at least one stereoscopic video source, so that the at least one stereoscopic video source may be used by the second terminal device for stereoscopic displaying of the conference site where the other terminal devices are located in a conference site where the second terminal device is located. Thus, by means of displaying a physically real three-dimensional image in air in a manner of non-screen displaying, the user corresponding to the second terminal device feels that the users corresponding to the other terminal devices are just in the local conference site of the second terminal device, which solves the problem of poor user experience of video conferencing in the related art, improves the sense of being present at the video conference, has no other differences from an on-site conference except that the entities cannot be touched, improves the user experience, and is an important step towards widely popularizing the video system.

As an example embodiment, the same as other terminal devices, the second terminal device may collect the stereoscopic video source of the conference site where the second terminal device is located, or synthesize the video data, audio data and video acquisition parameters to form the stereoscopic video source, and then send the stereoscopic video source to the MCU. By means of this method, the interaction of video conference is improved.

In an example embodiment, if the above-mentioned video data is three-dimensional images, the MCU or the second terminal device may make a convenient synthesis; if the above-mentioned video data is two-dimensional images, it is required to synthesize the two-dimensional images to form three-dimensional images, and then synthesize the three-dimensional images to form the stereoscopic video source. For example, in the case that the video data is two-dimensional images taken by multiple cameras, the second terminal device synthesizes the above-mentioned two-dimensional images taken by multiple cameras and the audio data to form the stereoscopic video source according to the video acquisition parameters; or in the case that the video data is a two-dimensional image taken by one camera, the second terminal device converts the two-dimensional image taken by the camera into a three-dimensional image according to the video acquisition parameters, and synthesizes the three-dimensional image and the audio data to form the stereoscopic video source.

In an example embodiment, the second terminal device may perform non-screen displaying of the stereoscopic video source in the local conference site through a holographic projection device, or the second terminal device may also implement non-screen displaying of the stereoscopic video source in the local conference site through multiple projectors set at different angles.

As an example embodiment, during non-screen displaying of the stereoscopic video source in the local conference site, the second terminal device may perform non-screen displaying according to at least one predetermined position. For example, stereoscopic video sources corresponding to other multiple terminal devices in the video conference may be displayed accordingly on multiple seats in the conference room according to a predetermined sequence. By means of this method, the user may feel that all the people in the video conference are in the conference room, and remote body language communication may be implemented by means of the method, thereby improving the user experience. Certainly, stereoscopic video sources corresponding to multiple terminal devices may also be synthesized into one stereoscopic video source in the MCU directly according to predetermined positions, likewise the user may also feel that all the people in the video conference are in the conference room, so as to achieve the effect of remote body language communication.

Corresponding to the above-mentioned another video conference display method, this embodiment also provides another video conference display device located in a second terminal device. The device is used to implement the above-mentioned embodiments and example embodiments, which has been described and will not be explained here. As used below, the term "component" is a combination of software and/or hardware capable of implementing predetermined functions. Although the device described in the following embodiment may be preferably implemented by software, it would be conceived to implement hardware or a combination of software and hardware.

Figure 5:
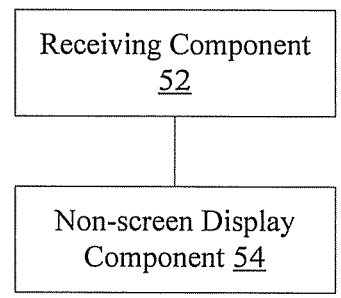
FIG. 5 shows a structure diagram of another video conference display device according to an embodiment of the disclosure.

FIG. 5 shows a structure diagram of another video conference display device according to an embodiment of the disclosure. As shown in FIG. 5, the device includes: a receiving component 52 and a non-screen display component 54. The components will be described below in detail.

The receiving component 52 is configured to receive at least one stereoscopic video source sent from the MCU, wherein the at least one stereoscopic video source is at least one stereoscopic video of at least one conference site where at least one other terminal device, except the second terminal device, in a video conference which the second terminal attends is located; and a non-screen display component 54 which is coupled to the receiving component 52 and configured to perform non-screen displaying of the at least one stereoscopic video source in a conference site where the second terminal device is located.

Through the above-mentioned components in this embodiment, the second terminal device uses the receiving component 52 to receive at least one stereoscopic video source of at least one conference site where at least one other terminal device in a video conference is located sent from the MCU, and uses the non-screen display component 54 to perform non-screen displaying of the at least one stereoscopic video source, so that the at least one stereoscopic video source may be used by the second terminal device for stereoscopic displaying of the at least one conference site where the at least one other terminal device is located in a conference site where the second terminal device is located. Thus, by means of displaying a physically real three-dimensional image in air in a manner of non-screen displaying, the user corresponding to the second terminal device feels that the users corresponding to the other terminal devices are just in the local conference site of the second terminal device, which solves the problem of poor user experience of video conferencing in the related art, improves the sense of being present at the video conference, has no other differences from an on-site conference except that the entities cannot be touched, improves the user experience, and is an important step towards widely popularizing the video system.

Figure 6:
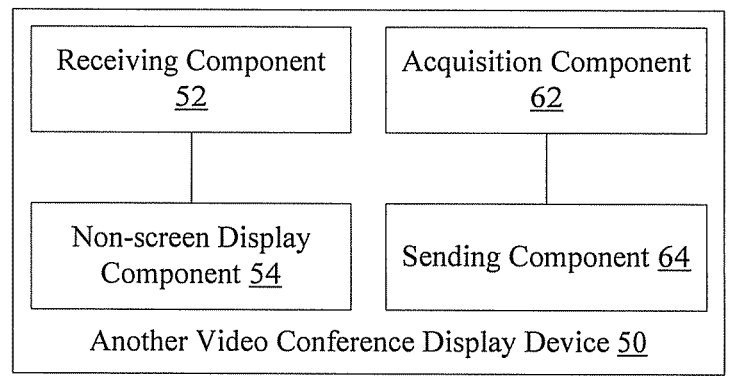
FIG. 6 shows an example structure diagram of another video conference display device according to an embodiment of the disclosure.

FIG. 6 shows an example structure diagram of another video conference display device 50 according to an embodiment of the disclosure. As shown in FIG. 6, the device 50 also includes: an acquisition component 62 which is configured to, for the second terminal device, acquire video data, audio data and video acquisition parameters of a conference site where the second terminal device is located; and a sending component 64 which is coupled to the acquisition component 62 and configured to send the video data, audio data and video acquisition parameters to the MCU, or to synthesize the video data, audio data and video acquisition parameters into a stereoscopic video source and send the stereoscopic video source to the MCU.

It will be described below in detail in conjunction with example embodiments which combine the above-mentioned embodiments and example implementations.

If a physically real three-dimensional image can be displayed, like "mirage", in air in a video conference through a non-screen medium, the sense of being present at the video conference may be greatly improved. Thus, for enhancing the effect of on-site conference, non-screen technology is used in a video conference system and stereoscopic video is employed, so that all parties in the video conference, no matter where they are, will feel that they are present in the on-site conference, and have no other differences from an on-site conference except that the entities cannot be touched, thereby greatly improving the liveness and interestingness of video conference and being an important step towards widely popularizing the video system. Thus, in the following example embodiments, provided is a non-screen video conference system using non-screen display technology.

Figure 7:
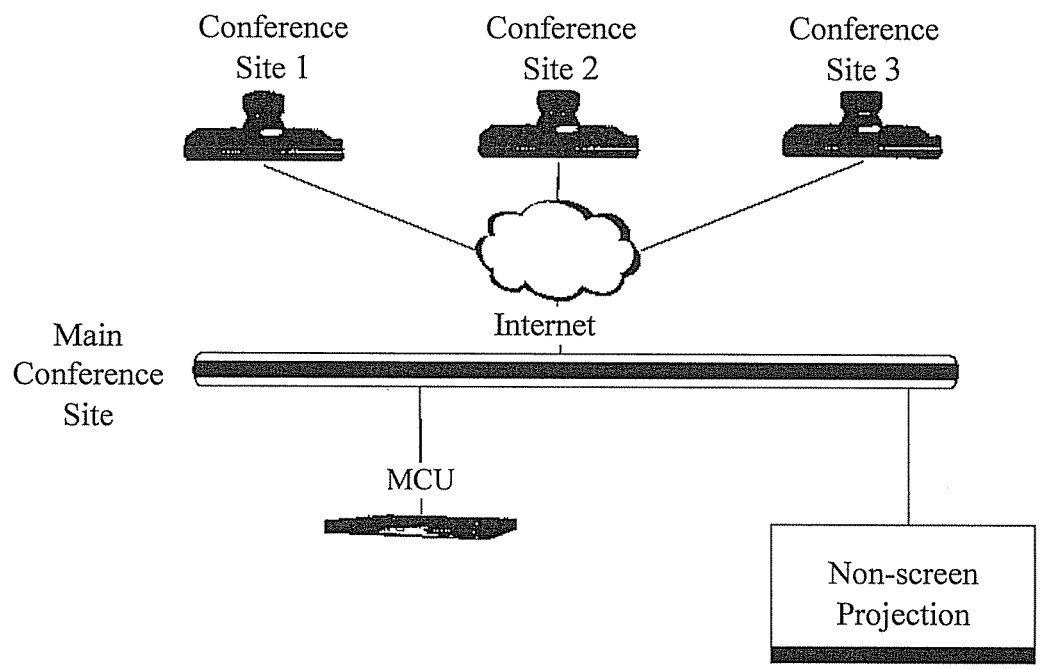
FIG. 7 shows a schematic diagram of a non-screen video conference system according to an example embodiment of the disclosure.

FIG. 7 shows a schematic diagram of a non-screen video conference system according to an example embodiment of the disclosure. In the following example embodiments, the non-screen video conference system as shown in FIG. 7 consists of terminal devices and a Management Control Unit (MCU), the terminal device being used for acquisition, processing and playing of video/audio data, and the management control unit being used for media data processing, conference control, etc. The principle of the system is: a terminal device acquires a stereoscopic video source or a terminal acquires a monocular video, an MCU or the terminal processing the video, and a conference terminal playing the stereoscopic image by non-screen technology.

In the following example embodiments, basic units of the system may include: a video data acquisition parameter component, a video data acquisition component, an audio data acquisition component, a video data coding component, an audio data coding component, a video data synthesis component, an audio data synthesis component, a video data output component, and an audio data output component.

Figure 8:
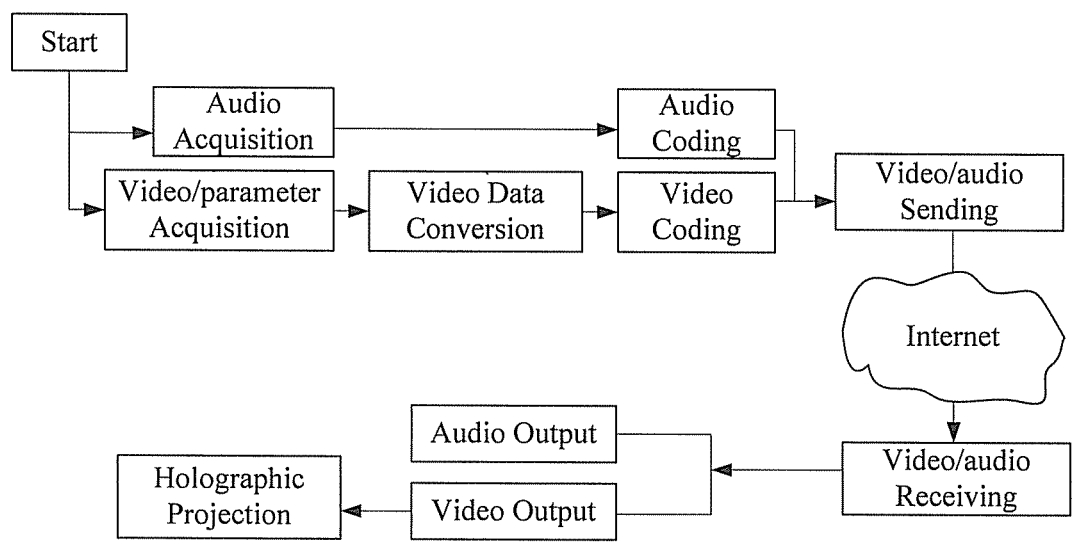
FIG. 8 shows a schematic diagram of data stream of a non-screen video system according to an example embodiment of the disclosure.

FIG. 8 shows a schematic diagram of data stream of a non-screen video system according to an example embodiment of the disclosure. With reference to FIG. 8, an implementation method for a non-screen video conference system in the following example embodiments may include the following steps.

S2, a terminal acquires audio and video data and the corresponding control parameter information;

S4, the terminal encodes the acquired data and transfers the encoded data to an MCU;

S6, the MCU performs processing according to the video data of the terminal conference site and the video acquisition parameters;

S8, the MCU encodes the video/audio data, and then distributes the encoded data to each terminal;

S10, the terminal receives the video/audio data transferred from the MCU and decodes the data; and S12, a stereoscopic image is output according to the decoded video/audio data through the terminal device.

Example I

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and holographic projection device. The terminal takes pictures of the conference site from different dimensions using multiple ordinary cameras connected with the terminal device. The terminal device encodes control parameters, such as dimension parameters, e.g., a distance between each camera and an object and an angle, and focal length parameters, together with the acquired data, and then sends the same to the Management Control Unit (MCU) through Internet or a special cable network. The MCU performs decoding, synthesizes a stereoscopic video source suitable for non-screen projection through a series of calculations according to the terminal control parameter information and the video data, and then performs coding and sends the encoded data to each conference terminal device through Internet or a special cable network. The terminal performs non-screen displaying using a holographic projection device.

Example II

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and holographic projection device. The terminal takes pictures of the conference site from different dimensions using multiple ordinary cameras connected with the terminal device. The terminal device obtains control parameters, such as dimension parameters, e.g., a distance between each camera and an object and an angle, and focal length parameters, together with the acquired data, synthesizes a stereoscopic video source according to the camera data and parameter information, encodes the stereoscopic video source, and then sends the encoded stereoscopic video source to the Management Control Unit (MCU) through Internet or a special cable network. The MCU performs coding and decoding and then sends the data obtained to each conference terminal device through Internet or a special cable network. The terminal performs non-screen displaying using a holographic projection device.

Example III

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and holographic projection device. The terminal takes pictures of the conference site using a three-dimensional camera connected to the terminal device. The terminal device encodes the acquired data and then sends the encoded data to the Management Control Unit (MCU) through Internet or a special cable network. The MCU performs coding and decoding and sends the data to each conference terminal device through Internet or a special cable network. The terminal performs non-screen displaying using a holographic projection device.

Example IV

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and projector. The terminal takes pictures of the conference site from different dimensions using multiple ordinary cameras connected with the terminal device. The terminal device encodes control parameters, such as dimension parameters, e.g., a distance between each camera and an object and an angle, and focal length parameters, together with the acquired data, and then sends the encoded data to the Management Control Unit (MCU) through Internet or a special cable network. The MCU performs coding and decoding and then sends the data obtained to each conference terminal device through Internet or a special cable network. The terminal device connected with multiple projectors delivers the data to specified projectors according to the collected video data, parameters and projector parameters, so that the projectors project from different angles to form a non-screen stereoscopic video in air.

Example V

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and projector. The terminal takes pictures of the conference site from different dimensions using multiple ordinary cameras connected with the terminal device. The terminal device encodes control parameters, such as dimension parameters, e.g., a distance between each camera and an object and an angle, and focal length parameters, together with the acquired data, and then sends the same to the Management Control Unit (MCU) through Internet or a special cable network. The MCU obtains the terminal projector parameter information at the same time; the MCU performs processing according to the acquired video data and the terminal camera and projector parameter information, performs coding and decoding, and then sends the obtained data to each conference terminal device through Internet or a special cable network. The terminal device acquires the data, and delivers the data to specified projectors, so that the projectors project from different angles to form a non-screen stereoscopic video in air.

Example VI

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and projector. The terminal takes pictures of the conference site using an ordinary camera connected with the terminal device. The terminal device encodes control parameters, such as dimension parameters, e.g., a distance between each camera and an object and an angle, and focal length parameters, together with the acquired data, and then sends the encoded data to the Management Control Unit (MCU) through Internet or a special cable network. The MCU obtains the terminal projector parameter information at the same time; the MCU converts the plane image into a three-dimensional image according to the acquired video data and parameter information of the terminal camera and projector, performs coding and decoding after processing the three-dimensional image, and then sends the obtained data to each conference terminal device through Internet or a special cable network. The terminal device acquires the data, and delivers the data to specified projectors, so that the projectors project from different angles to form a non-screen stereoscopic video in air.

Example VII

This embodiment makes a description by taking a non-screen projected video conference system as an example. Components of the video conference system include terminal devices and a management control unit. The management control unit uses e.g., an M9000 system, and the terminal device is provided with ordinary camera, video acquisition card, audio acquisition card, loudspeaker, microphone, and projector. The terminal takes pictures of the conference site using an ordinary camera connected to the terminal device. The terminal device obtains control parameters, such as dimension parameters, e.g., a distance between each camera and an object and an angle, and focal length parameters, together with the acquired data, converts the ordinary two-dimensional image into a three-dimensional image, performs coding, and then sends the encoded data to the Management Control Unit (MCU) through Internet or a special cable network. The MCU obtains the parameter information of the terminal projector at the same time; the MCU performs processing according to the acquired video data and the parameter information of the terminal camera, and projector, performs coding and decoding after processing, and then sends the obtained data to each conference terminal device through Internet or a special cable network. The terminal device acquires the data, and delivers the data to specified projectors, so that the projectors project from different angles to form a non-screen stereoscopic video in air.

In another embodiment, also provided is software for executing the technical solution described in the above-mentioned embodiments and example embodiments.

In another embodiment, also provided is a storage medium storing the above-mentioned software, the storage medium including but not limited to: optical disk, floppy disk, hard disk, erasable memory, etc.

Obviously, a person skilled in the art would understand that the above components and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. Thus, the disclosure is not limited to any particular combination of hardware and software.

The above description is only example embodiments of the disclosure and is not intended to limit the disclosure, and the disclosure can have a variety of changes and modifications for ordinary person skilled in the field. Any modification, equivalent replacement, or improvement made without departing from the principle of the disclosure should fall within the protection scope as defined by the appended claims of the disclosure.

What is claimed is:

1. A video conference display method, comprising:
a Management Control Unit (MCU) obtaining a stereoscopic video source of a conference site where a first terminal device in a video conference is located; and
the MCU sending the stereoscopic video source to one or more other terminal devices, except the first terminal device, in the video conference to trigger the one or more other terminal devices perform the non-screen displaying of the stereoscopic video source in the conference site where the one or more other terminal devices are located according to at least one predetermined position, wherein the stereoscopic video source is used by the one or more other terminal devices for non-screen displaying of the conference site where the first terminal device is located in one or more conference sites where the one or more other terminal devices are located.

2. The method according to claim 1, wherein the MCU obtaining the stereoscopic video source of the conference site where the first terminal device in the video conference is located comprises:
the MCU obtaining video data, audio data and video acquisition parameters of the conference site where the first terminal device is located sent from the first terminal device, and the MCU synthesizing the video data, the audio data and the video acquisition parameters to form the stereoscopic video source; or
the MCU obtaining the stereoscopic video source sent from the first terminal device.

3. The method according to claim 2, wherein
in a case that the video data is two-dimensional images taken by multiple cameras, the MCU synthesizes the two-dimensional image taken by the multiple cameras and the audio data according to the video acquisition parameters to form the stereoscopic video source; or
in a case that the video data is a two-dimensional image taken by one camera, the MCU converts the two-dimensional image taken by the camera into a three-dimensional image according to the video acquisition parameters, and synthesizes the three-dimensional image and the audio data to form the stereoscopic video source.

4. A video conference display method, comprising:
a second terminal device receiving at least one stereoscopic video source sent from a Management Control Unit (MCU), wherein the at least one stereoscopic video source is at least one stereoscopic video of at least one conference site where at least one other terminal device, except the second terminal device, in a video conference which the second terminal attends is located; and
the second terminal device performing non-screen displaying of the at least one stereoscopic video source in a conference site where the second terminal device is located;
wherein the second terminal device performing the non-screen displaying of the at least one stereoscopic video source in the conference site where the second terminal device is located comprises: the second terminal device performing the non-screen displaying of the at least one stereoscopic video source in the conference site where the second terminal device is located according to at least one predetermined position.

5. The method according to claim 4, further comprising:
the second terminal device acquiring video data, audio data and video acquisition parameters of the conference site where the second terminal device is located; and
the second terminal device sending the video data, the audio data and the video acquisition parameters to the MCU, or the second terminal device synthesizing the video data, the audio data and the video acquisition parameters into a stereoscopic video source and sending the stereoscopic video source to the MCU.

6. The method according to claim 5, wherein
in a case that the video data is two-dimensional images taken by multiple cameras, the second terminal device synthesizes the two-dimensional image taken by the multiple cameras and the audio data according to the video acquisition parameters to form the stereoscopic video source; or
in a case that the video data is a two-dimensional image taken by one camera, the second terminal device converts the two-dimensional image taken by the camera into a three-dimensional image according to the video acquisition parameters, and synthesizes the three-dimensional image and the audio data to form the stereoscopic video source.

7. The method according to claim 4, wherein the second terminal device performing the non-screen displaying of the at least one stereoscopic video source in the conference site where the second terminal device is located by one of the following manners:
a holographic projection device, or multiple projectors set at different angles.

8. A video conference display device located in a Management Control Unit (MCU), wherein the video conference display device comprises:
an obtaining component which is configured to obtain a stereoscopic video source of a conference site where a first terminal device in a video conference is located; and
a sending component which is configured to send the stereoscopic video source to one or more other terminal devices, except the first terminal device, in the video conference to trigger the one or more other terminal devices perform the non-screen displaying of the stereoscopic video source in the conference site where the one or more other terminal devices are located according to at least one predetermined position, wherein the stereoscopic video source is used by the one or more other terminal devices for non-screen displaying of the conference site where the first terminal device is located in one or more conference sites where the one or more other terminal devices are located.

9. The device according to claim 8, wherein the obtaining component comprises:
an obtaining unit which is configured to obtain video data, audio data and video acquisition parameters of the conference site where the first terminal device is located sent from the first terminal device; and
a synthesis unit which is configured to, in a case that the video data is two-dimensional images taken by multiple cameras, synthesize the two-dimensional image taken by the multiple cameras and the audio data according to the video acquisition parameters to form the stereoscopic video source, or in a case the video data is a two-dimensional image taken by one camera, convert the two-dimensional image taken by the camera into a three-dimensional image according to the video acquisition parameters, and synthesize the three-dimensional image and the audio data to form the stereoscopic video source.

10. A video conference display device located in a second terminal device, wherein the video conference display device comprises:
a receiving component which is configured to receive at least one stereoscopic video source sent from a Management Control Unit (MCU), wherein the at least one stereoscopic video source is at least one stereoscopic video of at least one conference site where at least one other terminal device, except the second terminal device, in a video conference which the second terminal attends is located; and
a non-screen display component which is configured to perform non-screen displaying of the at least one stereoscopic video source in a conference site where the second terminal device is located;
wherein the non-screen display component is configured to perform non-screen displaying of the at least one stereoscopic video source in a conference site where the second terminal device is located by the following step: the second terminal device performing the non-screen displaying of the at least one stereoscopic video source in the conference site where the second terminal device is located according to at least one predetermined position.

11. The device according to claim 10, further comprising:
an acquisition component which is configured to acquire video data, audio data and video acquisition parameters of the conference site where the second terminal device is located; and
a sending component which is configured to send the video data, the audio data and the video acquisition parameters to the MCU, or to synthesize the video data, the audio data and the video acquisition parameters to form a stereoscopic video source and then send the stereoscopic video source to the MCU.

12. The method according to claim 5, wherein the second terminal device performing the non-screen displaying of the at least one stereoscopic video source in the conference site where the second terminal device is located by one of the following manners:
a holographic projection device, or multiple projectors set at different angles.

13. The method according to claim 6, wherein the second terminal device performing the non-screen displaying of the at least one stereoscopic video source in the conference site where the second terminal device is located by one of the following manners:
a holographic projection device, or multiple projectors set at different angles.

* * * * *